Figure 1:
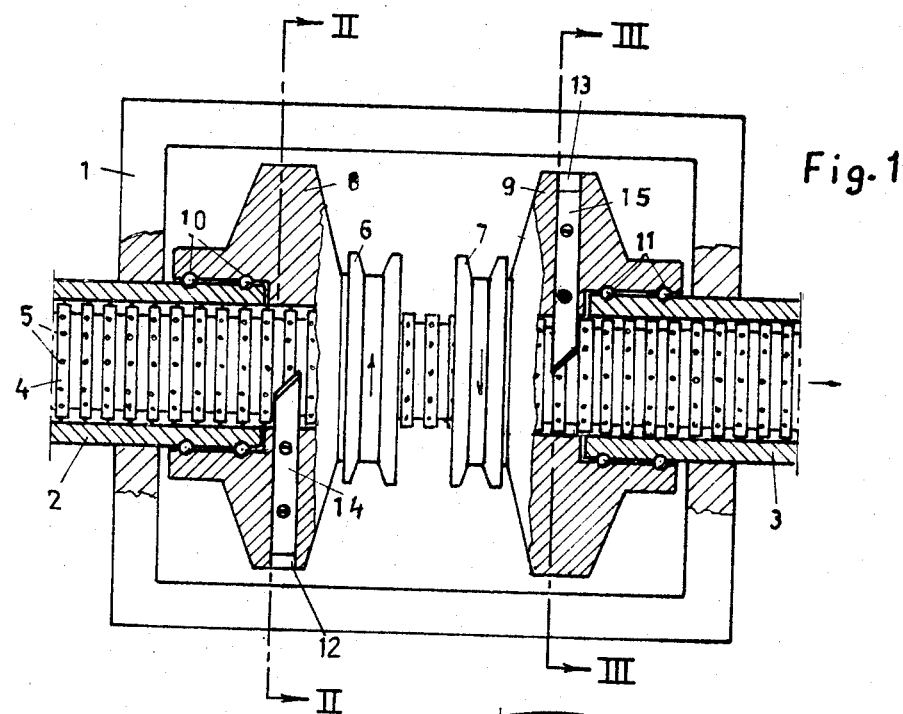

United States Patent [19]
Nordstrom

[11] 3,868,876
[45] Mar. 4, 1975

[54] APPARATUS FOR MANUFACTURING PERFORATED TUBES

[76] Inventor: Erik Gustav Wendel Nordstrom, Box 84, 840 20 Ange, Sweden

[22] Filed: Nov. 1, 1973

[21] Appl. No.: 411,724

Related U.S. Application Data

[62] Division of Ser. No. 181,540, Sept. 17, 1971, abandoned.

[30] Foreign Application Priority Data
Sept. 22, 1970 Sweden.............................. 12868/70

[52] U.S. Cl. .................................................. 82/20
[51] Int. Cl. ........................................... B23b 21/00
[58] Field of Search ......................................... 82/20

[56] References Cited
UNITED STATES PATENTS

| | | | |
|---|---|---|---|
| 456,316 | 7/1891 | Slater .................................. | 82/20 X |
| 2,300,967 | 11/1942 | Reed et al ............................... | 82/20 |
| 2,427,322 | 9/1947 | Darner.................................... | 82/20 |
| 2,619,174 | 11/1952 | Neale................................... | 82/20 X |
| 2,858,552 | 11/1958 | Hercik .................................. | 82/20 |
| 3,106,009 | 10/1963 | Mullins ................................ | 82/20 X |
| 3,131,588 | 5/1964 | McConnell ......................... | 82/20 X |
| 3,513,731 | 5/1970 | Michelson............................. | 82/20 |

Primary Examiner—Harrison L. Hinson
Attorney, Agent, or Firm—Silverman & Cass, Ltd.

[57] ABSTRACT

A method and a machine for manufacturing draining tubes of synthetic resin with a perforated wall. The tube wall is provided with hollow projections on the wall and said projections are cut off by cutting tools which are rotating round the tube when the tube is fed axially through a cutting machine.

4 Claims, 5 Drawing Figures

INVENTOR:
ERIK GUSTAV WENDEL NORDSTRÖM
BY:
Silverman & Cass
ATTORNEYS.

INVENTOR:
ERIK GUSTAV WENDEL NORDSTRÖM

APPARATUS FOR MANUFACTURING PERFORATED TUBES

This is a division of application Ser. No. 181,540 Filed Sept. 17, 1971, now abandoned.

BACKGROUND OF THE INVENTION

Draining tubes of synthetic resin are already known. The draining openings in the wall are generally formed by slots which run in the axial direction of the tube. Each row of such slots forms a longitudinal indication of fracture along which the tube wall may break when it is exposed to pressure.

Tubes are also known in the wall of which openings are provided which are made by a stitching operation. Such openings will be surrounded by burr at the inside of the tube and mud and small particles are liable to collect on such burr and give cause to the forming of stoppers in the tube.

An object of the present invention is to provide a draining tube with openings which do not appreciably impair the strength of the tube wall and which have no burr at the inside of the tube.

SHORT SUMMARY OF THE INVENTION

The invention relates to a method for manufacturing tubes, preferably corrugated tubes of synthetic resin, with a perforated wall, said wall being provided with hollow projections or bubbles, and is substantially characterized by the fact, that during axial displacement of the tube, said projections are entirely or partly cut away by means of cutting tools which are rotating round the tube.

SHORT DESCRIPTION OF THE DRAWINGS

Figure 2:
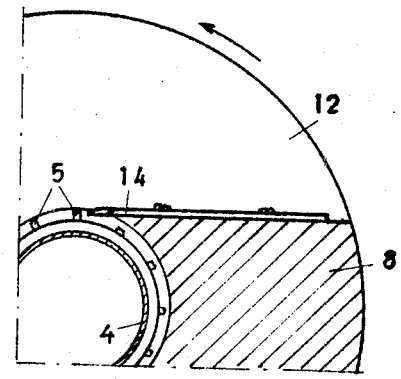
Figure 3:
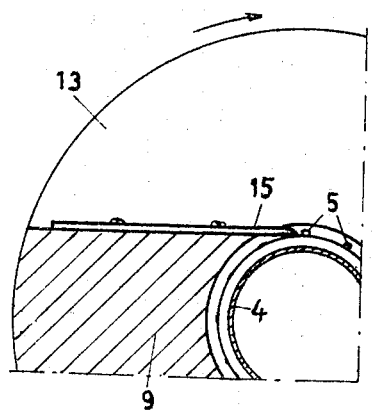
Figure 4:
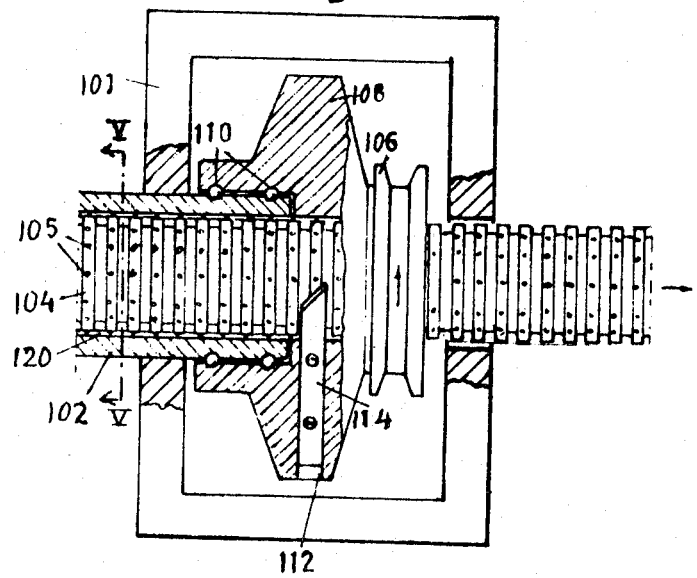
Figure 5:
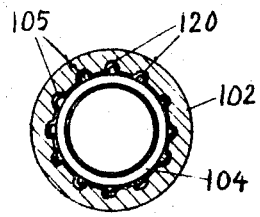

FIG. 1 illustrates, partly in section, and in a simplified form a machine for carrying out the method according to the invention, FIG. 2 illustrates a section along the line II—II in FIG. 1, on a greater scale, FIG. 3 illustrates a section along the line III—III in FIG. 1 on a greater scale, FIG. 4 illustrates in the same way as FIG. 1 a machine according to a modified embodiment of the invention and FIG. 5 is a section of the device shown in FIG. 1 along the line V—V.

COMPLETE DESCRIPTION OF THE INVENTION WITH REFERENCE TO THE DRAWINGS

The machine according to FIGS. 1 to 3 for carrying out the method according to the invention comprises a frame 1 which is provided with guiding sleeves 2,3 for guiding a plastic tube 4 with a corrugated wall, which is continuously fed through the sleeves by mechanical means, not shown. The corrugated wall of the tube 4 has annular ridges and annular grooves. The ridges are provided with short, hollow projections or bubbles 5. Between said guiding sleeves 2,3 the tube is surrounded by two belt pulleys 6 and 7 each of which is provided with a central bore for the passage of said tube. The belt pulleys 6 and 7 are provided with hub portions 8 and 9 by means of which they are rotatably pivoted on the sleeves 2 and 3 by ball bearings 10 and 11.

Each of the hub portions 8 and 9 is provided with a recess 12 and 13 respectively. A cutter 14 and 15, respectively, is fastened in each of said recesses 13 and 14 as shown in FIGS. 1 to 3.

The belt pulleys 6 and 7 are rotated by means of belts, not shown, in opposite directions, as indicated by the arrows in FIG. 1.

As illustrated in FIG. 2, the cutter 14 is adapted to cut off about the half of each projection 5 during the rotation of the hub portion 8.

In a similar way, the cutter 15 is adapted to cut off most or all of the rests of the projections 5. Preferably, a very low portion of each projection should be left, said portion forming a low collar round the opening provided by the cutting off of said projection.

Because the cutters 14 and 15 are rotating in opposite directions and with the same speed, the torques generated by the two cutters on the tube balance each other, and therefore, the tube does not tend to rotate. Further, the edges of the cutters are so adjusted in relation to each other, that the cutting pressures in the axial direction of the tube are balanced. Therefore, the tube has no tendency to be displaced axially by the cutting operation.

However, the tube 4 is continuously moved in an axial direction, without rotation, by means of a feeding device, not shown, or the machine according to the invention may be located just outside the extruding apparatus by which the tube is made by extrusion.

The feeding device, if any, may comprise one or more toothed wheels each of which is mounted for rotation on an axis which makes a right angle to the longitudinal direction of the tube and the teeth of which are adapted to cooperate with the grooves of the corrugated tube wall and thus to feed the tube through the machine.

In FIGS. 4 and 5 there is illustrated a modified embodiment of a machine according to the present invention. In this embodiment there is a frame 101 similar to the frame 1 of FIG. 1, but shorter. In said frame there is mounted a guiding sleeve 102 corresponding to the guiding sleeve 2 of FIG. 1. There is only one belt pulley 106, corresponding to the pulley 6 in FIG. 1. The belt pulley 106 is mounted for rotation round the guiding sleeve 102 by means of ball bearings 110. The hub portion 108 of the belt pulley 106 is provided with a cutter 114 which is adapted to cut the projections 5 of the tube 4 fed through the sleeve 102.

In order to relieve the tube of torsional strain caused by the cutting operation, the inner diameter of the sleeve 102 is of slightly greater size than the outer diameter of the tube and the inner wall of the guiding sleeve 102 is provided with longitudinal grooves 120 (See FIG. 5) for receiving and guiding the projections 5 of the tube 104.

By means of said grooves 120 the tube 104 is guided also in a circumferential direction and relieved from torsional strain.

The openings provided in the tube wall by the method according to this invention do not form any indications of fracture and do not impair the rigidity of the tube wall and if a low collar is left round each opening this will stiffen the edge of said opening. The machine is very simple and the production of the openings is carried out very rapidly. Therefore the productions of draining tube is very much simplified and reduced in price by the method according to the invention.

The invention as described can be varied in several ways within the scope of the appended claims. Thus, the cutters may be adjustable or substituted by cutters of other form for cutting the projections or bubbles, regardless of whether such projections or bubbles are provided on the corrugations of a corrugated tube or the outer wall of a cylindrical tube without corrugations.

What I claim is:

1. Apparatus for forming perforations in the wall of a corrugated plastic tube having hollow projections provided thereon, said apparatus comprising a stationary frame, at least one guide sleeve fixed thereto and having an interior defining an internal guide for a tube to be fed therethrough, a drive wheel rotatively mounted on a terminal end of the sleeve and projecting axially outward therefrom, said wheel, beyond said terminal end, having a central bore forming a continuation of the guide defining interior of the sleeve and a guide for the tube passing therethrough, said wheel provided with drive means for rotating said wheel relative to said sleeve and the tube as the tube is moved through the sleeve, at least one knife blade positioned on the wheel outward of said terminal end and projecting into the bore of the wheel inward of the ends thereof in the path of the tube projections tangentially with the circumference of the tube, whereby movement of the tube through the terminal end of the sleeve and the wheel while simultaneously rotating the wheel will cause the blade to intersect the projections and cut the same away from the tube and expose the perforations.

2. Apparatus as claimed in claim 1 in which there are two sleeves and two wheels, each of said wheels being rotatable in opposite directions around the tube, and the blade of one wheel is positioned to cut only part of the projections from the tube and the blade of the other wheel is positioned to cut substantially all of the remaining portions of the projections from the tube.

3. Apparatus as claimed in claim 2 in which said drive means includes a belt pulley on each wheel, each pulley having a hub portion positioned upon a respective sleeve, the sleeves being coaxially aligned with the pulleys being positioned between the hubs portions.

4. Apparatus as claimed in claim 1 in which the projections are formed rectilinearly along the longitudinal dimension of the tube, the sleeve having longitudinal grooves provided on the inside wall thereof to engage the projections during movement of the tube through the sleeve and thereby prevent rotation of the tube.

* * * * *